US009266229B2

(12) United States Patent
Atsumi et al.

(10) Patent No.: US 9,266,229 B2
(45) Date of Patent: Feb. 23, 2016

(54) AUTOMATIC TRANSMISSION FOR POWER TOOLS (71) Applicant: Panasonic Intellectual Property Management Co., Ltd., Osaka (JP)

(72) Inventors: Masatoshi Atsumi, Shiga (JP); Hiroshi Matsumoto, Mie (JP); Toshio Kudo, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/399,797

(22) PCT Filed: May 8, 2013

(86) PCT No.: PCT/JP2013/002972
§ 371 (c)(1),
(2) Date: Nov. 7, 2014

(87) PCT Pub. No.: WO2013/168426
PCT Pub. Date: Nov. 14, 2013

(65) Prior Publication Data
US 2015/0133255 A1 May 14, 2015

(30) Foreign Application Priority Data
May 11, 2012 (JP) .................. 2012-109667

(51) Int. Cl.
*B25F 5/00* (2006.01)
*F16H 63/18* (2006.01)
*F16H 63/30* (2006.01)

(52) U.S. Cl.
CPC ............ *B25F 5/001* (2013.01); *F16H 63/18* (2013.01); *F16H 63/304* (2013.01); *F16H 2063/3056* (2013.01)

(58) Field of Classification Search
CPC B25F 5/001; F16H 63/304; F16H 2063/3056
See application file for complete search history.

(56) References Cited

U.S. PATENT DOCUMENTS

| 3,872,742 A | 3/1975 | States |
| 2002/0096343 A1 | 7/2002 | Potter et al. |

(Continued)

FOREIGN PATENT DOCUMENTS

| CN | 101220859 A | 7/2008 |
| EP | 0427510 A1 | 5/1991 |

(Continued)

OTHER PUBLICATIONS

International Preliminary Report on Patentability issued in International Application No. PCT/JP2013/002972 dated Nov. 11, 2014.

(Continued)

*Primary Examiner* — Huan Le
(74) *Attorney, Agent, or Firm* — McDermott Will & Emery LLP (57) ABSTRACT

An automatic gearshift device for a power tool includes a speed reduction mechanism that decelerates and transmits a rotary power of a motor, a ring gear that slides and moves to switch a speed reduction ratio, a cam member that moves the ring gear, a rotation body rotated in cooperation with the cam member, a position detector that detects the position of the ring gear, and a controller that controls the driving of the gearshift motor based on the value generated by the position detector. An adjustment gear forming the rotation body includes a slot used as a positioning mark at a predetermined location in the rotating direction. When the slot of the adjustment gear is aligned with a predetermined device side positioning reference, the rotation body is positioned in an initial position in a relative positional relationship with the ring gear.

6 Claims, 5 Drawing Sheets

(56) References Cited

U.S. PATENT DOCUMENTS

| | | | |
|---|---|---|---|
| 2004/0211576 A1 | 10/2004 | Milbourne et al. | |
| 2007/0201748 A1 | 8/2007 | Bixler et al. | |
| 2009/0071671 A1 | 3/2009 | Zhong et al. | |
| 2009/0071673 A1 | 3/2009 | Zhong et al. | |
| 2010/0159843 A1 | 6/2010 | Ikeda et al. | |
| 2011/0162861 A1 | 7/2011 | Borinato et al. | |
| 2011/0232933 A1* | 9/2011 | Kondo et al. | 173/217 |
| 2012/0006574 A1* | 1/2012 | Atsumi et al. | 173/176 |
| 2012/0010043 A1 | 1/2012 | Inagaki et al. | |
| 2012/0028753 A1 | 2/2012 | Atsumi et al. | |
| 2013/0175066 A1* | 7/2013 | Zhang et al. | 173/47 |
| 2014/0045653 A1* | 2/2014 | Atsumi et al. | 477/115 |

FOREIGN PATENT DOCUMENTS

| | | |
|---|---|---|
| JP | 49-56276 A | 5/1974 |
| JP | 03-221381 A | 9/1991 |
| JP | 06-218609 A | 8/1994 |
| JP | 08-068461 A | 3/1996 |
| JP | 2004-526103 A | 8/2004 |
| JP | 2007-527977 A | 10/2007 |
| JP | 2009-078349 A | 4/2009 |
| JP | 2009-125909 A | 6/2009 |
| JP | 2010-154129 A | 7/2010 |
| JP | 2012-16760 A | 1/2012 |
| JP | 2012-030312 A | 2/2012 |
| JP | 2012-030347 A | 2/2012 |
| WO | 2005/093290 A1 | 10/2005 |

OTHER PUBLICATIONS

International Search Report issued in Application No. PCT/JP2013/002972 dated Jul. 2, 2013.

Chinese Office Action dated Jun. 25, 2015, issued in corresponding Chinese Application No. 201380024189.1. (with English translation).

* cited by examiner

AUTOMATIC TRANSMISSION FOR POWER TOOLS

CROSS-REFERENCE TO RELATED APPLICATIONS

The present application is the U.S. National Phase of PCT/JP2013/002972 filed May 8, 2013, which claims priority to Japanese Patent Application No. 2012-109667 filed May 11, 2012. The disclosures of the above applications are incorporated herein by reference.

TECHNICAL FIELD

The present invention relates to an automatic gearshift device for a power tool that is capable of switching a speed reduction ratio.

BACKGROUND ART

In the prior art, there is a power tool that includes a speed reduction mechanism, which decelerates and transmits the rotary power of a motor that is a driving source, and switches the speed reduction ratio by sliding a switching member of the speed reduction mechanism (for example, patent document 1).

The power tool of patent document 1 includes a gearshift actuator, which slides the switching member, a driving state detector, which detects a driving state of the motor, a slide position detector, which detects a position where the switching member slides, and a controller, which controls the driving of the gearshift actuator. The controller controls the driving of the gearshift actuator in correspondence with detection results of the driving state detector and the slide position detector to automatically switch the speed reduction ratio.

Additionally, as an example of the slide position detector, the fourth embodiment in patent document 1 illustrates a displacement sensor that detects a rotational state of a rotational gearshift actuator. The switching member moves in cooperation with the rotation of the gearshift actuator. Therefore, the displacement sensor indirectly detects the position of the switching member by detecting the rotational state of the gearshift actuator.

The movement distance of the switching member for switching the speed reduction ratio and the rotation angle of the gearshift actuator for moving the switching member are set in advance in correspondence with a number of speed reduction ratios. The displacement sensor is set so that when the rotation angle of the gearshift actuator from a predetermined initial position in the rotating direction reaches an angle that is needed to move the switching member, the displacement sensor generates a value that corresponds to the switched speed reduction ratio.

For example, the gearshift actuator rotates between a rotation angle corresponding to a low speed rotation mode for a large speed reduction ratio and a rotation angle corresponding to a high speed rotation mode for a small speed reduction ratio. When the rotation angle of the gearshift actuator reaches the rotation angle that corresponds to the low speed rotation mode, the displacement sensor generates a value that corresponds to the large speed reduction ratio. When the rotation angle of the gearshift actuator reaches the rotation angle that corresponds to the high speed rotation mode, the displacement sensor generates a value that corresponds to the small speed reduction ratio. Thus, based on the value provided from the displacement sensor, the controller determines the present speed reduction ratio and whether or not the switching of the speed reduction ratio has been completed.

PRIOR ART DOCUMENT

Patent Document

Patent Document 1: Japanese Laid-Open Patent Publication No. 2012-16760

SUMMARY OF THE INVENTION

Problems that are to be Solved by the Invention

As a prerequisite, the displacement sensor and the gearshift actuator have a preset positional relation relative to the switching member that is located at a predetermined position. If the displacement sensor is incorporated in a device without establishing the relative position relation, the switching member may fail to reach a target position even though the displacement sensor generates a value corresponding to the predetermined speed reduction ratio. In such a case, the motor may be driven without the switching member being engaged with a corresponding member.

When coupling a component such as the displacement sensor to the device, there is a need to subsequently check whether or not the component is in conformance with the positional relationship relative to the switching member. Additionally, when not in conformance with the relative positional relationship, the relative positional relationship needs to be corrected. In this manner, time and effort is necessary to check and correct the positional relationship of the component relative to the switching member.

It is an object of the present invention to provide an automatic gearshift device for a power tool that allows for easy positioning of a component.

Means for Solving the Problem

To solve the above problem, an automatic gearshift device for a power tool according to the present invention includes a speed reduction mechanism including a gear, a switching member, a gearshift motor, a cam member, a rotation body, a position detector, and a controller. The speed reduction mechanism decelerates and transmits a rotary power of a driving source. The switching member slides and moves to an engagement position where the switching member engages with the gear member of the speed reduction mechanism to switch a speed reduction ratio of the speed reduction mechanism. The cam member is driven and rotated by the gearshift motor to move the switching member to the engagement position. The rotation body is rotated in cooperation with the cam member when driven by the gearshift motor. The rotation body includes a positioning mark set at a predetermined position in a rotating direction of the rotation body, and the rotation body is positioned in an initial position in a predetermined relative positional relationship with the switching member. The position detector detects movement of the switching member to the engagement position and generates a value indicating that the switching member has moved to the engagement position when the rotation body is rotated from the initial position by a predetermined rotation angle. The controller controls the driving of the gearshift motor based on the value generated by the position detector. The rotation body is located at the initial position when the positioning mark is aligned with a predetermined device side positioning reference.

Preferably, in the above embodiment, the rotation body includes a detection shaft, which is driven and rotated by the gearshift motor, and an adjustment gear, which is rotated integrally with the detection shaft, the adjustment gear includes a slot, which is formed by cutting away a tooth located at a position corresponding to the device side positioning reference and which is used as the positioning mark, and the position detector generates a value corresponding to a rotation angle of the detection shaft.

Preferably, the above embodiment includes an accommodation case that accommodates the gearshift motor and the position detector and supports the rotation body so that the rotation body is rotatable. The device side positioning reference is set at a predetermined position in the accommodation case. When the positioning mark of the rotation body is aligned with the device side positioning reference of the accommodation case, the switching member is located at the engagement position and the position detector generates a value indicating that the switching member is located at the engagement position.

Preferably, the above embodiment includes a rotation shaft driven and rotated by the gearshift motor, an output gear that rotates integrally with the rotation shaft, and an accommodation case that supports the rotation shaft and the rotation body so that the rotation shaft and the rotation body are rotatable. The cam member includes a main body, an engagement portion, and an alignment groove. The main body includes a cam portion, which guides movement of the switching member. The engagement portion projects from the main body and includes an arcuate outer circumferential surface. The engagement portion includes a teeth-shaped engagement portion, which is arranged on a distal end of the arcuate outer circumferential surface and which is capable of engaging with the output gear. The alignment groove formed in part of a distal end of the engagement portion. The alignment groove includes a fixed depth from the outer circumferential surface. The accommodation case includes an alignment projection, which can be inserted through the alignment groove when the rotation shaft and the rotation body are coupled to the accommodation case.

Preferably, the above embodiment includes a rotation shaft driven and rotated by the gearshift motor, an output gear that rotates integrally with the rotation shaft, and an accommodation case that supports the rotation shaft and the rotation body so that the rotation shaft and the rotation body are rotatable. The cam member includes a main body, an engagement portion, and an alignment plate. The main body includes a cam portion, which guides movement of the switching member. The engagement portion projects from the main body and includes an arcuate outer circumferential surface. The engagement portion includes a teeth-shaped engagement portion, which is arranged on a distal end of the arcuate outer circumferential surface and which is capable of engaging with the output gear. The alignment plate projects from the main body beyond the engagement portion. The alignment plate includes an alignment groove formed by cutting away a portion of a distal end of the alignment plate. The output gear includes an alignment projection, which can be inserted through the alignment groove when the rotation shaft and the rotation body are coupled to the accommodation case.

Preferably, in the above embodiment, the alignment groove is formed toward one end of the distal end of the engagement portion, and when a tooth of the teeth-shaped engagement portion that is located at a position corresponding to the alignment groove is engaged with the output gear, the cam member arranges the switching member at the engagement position.

Effects of the Invention

The present invention provides an automatic gearshift device for a power tool that allows for easy positioning of a component.

EMBODIMENTS OF THE INVENTION

An automatic gearshift device according to embodiments of the present invention will now be described with reference to the drawings.

First Embodiment

Figure 1:
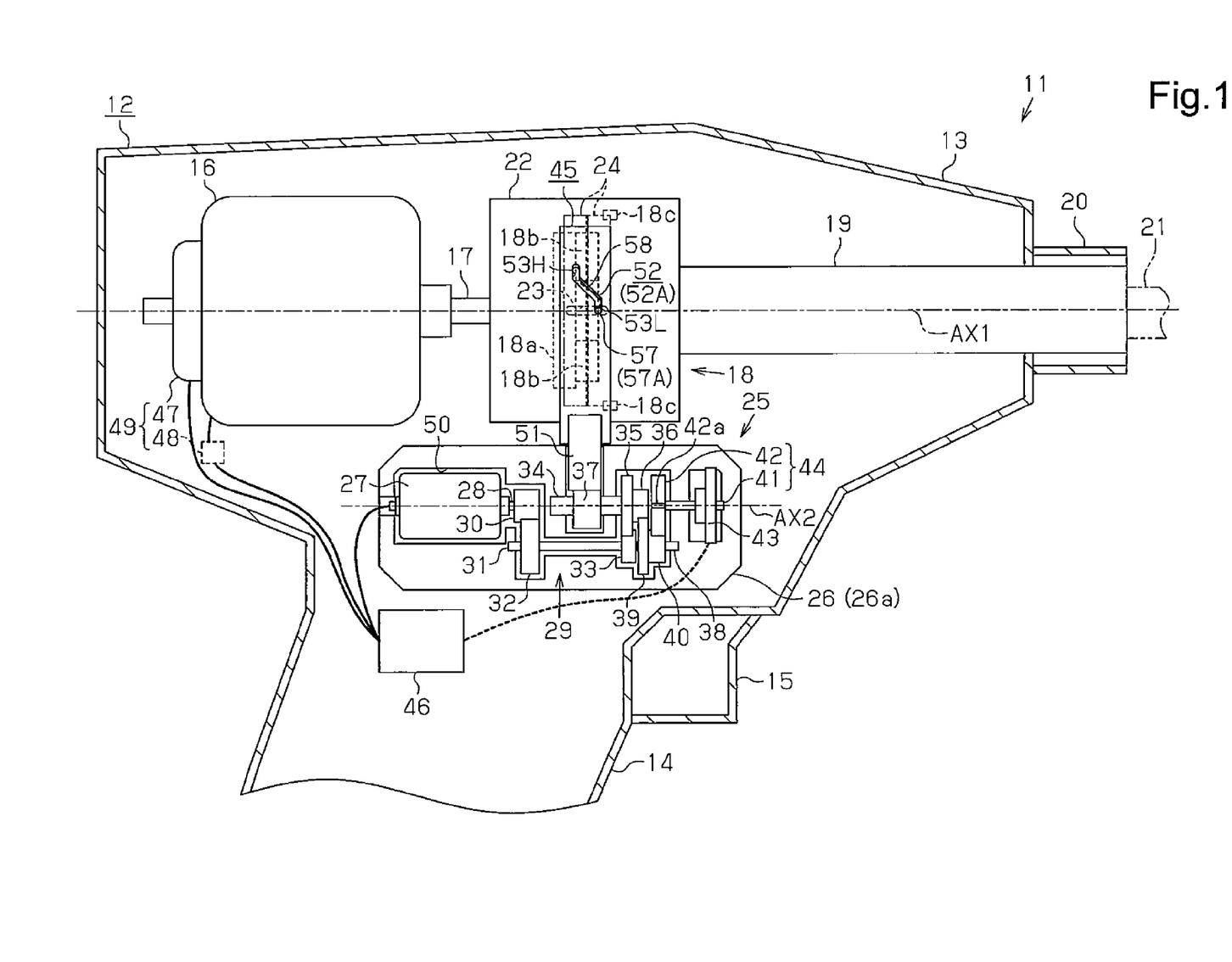
FIG. 1 is a cross-sectional view showing the schematic configuration of a power tool according to a first embodiment of the present invention.

As shown in FIG. 1, a power tool 11 of a first embodiment is used, for example, as an electric driver and includes a main body case 12, which is generally T-shaped as viewed from beside. The main body case 12 includes a cylindrical barrel 13 and a grip portion 14, which extends from an intermediate portion of the barrel 13 in the longitudinal direction. An activation instruction switch 15, which can be pulled toward the grip portion 14, is arranged on an end portion of the grip portion 14 at the side of the barrel 13.

In the description hereafter, the extending direction of the grip portion 14 is referred to as the downward direction. The direction opposite to the downward direction is referred to as the upward direction. Additionally, in the longitudinal direction of the barrel 13, the side of the grip portion 14 where the activation instruction switch 15 is arranged is referred to as the front side. The side opposite to the front side is referred to as the rear side.

A motor 16, which serves as a driving source, is accommodated in the rear side of the barrel 13 of the main body case 12. The motor 16 is driven when the activation instruction switch 15 is operated. A speed reduction mechanism 18, which reduces speed and transmits the rotary power of the motor 16, and a drive transmission unit 19, which transmits the rotary power transmitted through the speed reduction mechanism 18, are accommodated in the barrel 13 in front of the motor 16. The speed reduction mechanism 18 and the drive transmission unit 19 are arranged along the axial direction of an output shaft 17 of the motor 16 that extends toward the front.

A bit 21 is attached in a removable manner to a distal end portion 20 of the drive transmission unit 19. The bit 21 is rotated by the rotary power of the motor 16 transmitted through the speed reduction mechanism 18 and the drive transmission unit 19.

The speed reduction mechanism 18 includes a gear case 22, which is cylindrical and has a closed end, and a planetary speed reduction mechanism, which is accommodated in the gear case 22. A side wall of the gear case 22 includes two through holes 23, which are located at opposite sides of an axis AX1 of the output shaft 17 and elongated in the axial direction of the output shaft 17. The speed reduction mechanism 18 includes a ring gear 24, which is accommodated in the gear case 22 and slidable in the axial direction of the output shaft 17. The ring gear 24 forms a portion of the planetary speed reduction mechanism.

The ring gear 24 slides between first and second engagement positions where the ring gear 24 engages gear members forming the planetary speed reduction mechanism of the speed reduction mechanism 18. This switches the speed reduction ratio of the rotary power, which the speed reduction mechanism 18 transmits, between two stages. In the first embodiment, in the first engagement position, which is located relatively toward the rear side and indicated by the double-dashed line in FIG. 1, the ring gear 24 is engaged with a first-stage carrier 18a and a second-stage planet gear 18b, which serve as gear members forming the planetary speed reduction mechanism. When the ring gear 24 is located in the first engagement position, the speed reduction mechanism 18 shifts to the high speed rotation mode for the small speed reduction ratio.

When moved toward the front from the first engagement position, the ring gear 24 is disengaged from the carrier 18a. Further, when moved to the relatively front second engagement position, which is indicated by the dashed line in FIG. 1, the ring gear 24 is engaged with the planet gear 18b and a fixed tooth portion 18c, which serve as gear members forming the speed reduction mechanism 18. An internal wall of the gear case 22 includes the fixed tooth portion 18c. When the ring gear 24 is located in the second engagement position, the speed reduction mechanism 18 shifts to the low speed rotation mode for the large speed reduction ratio.

In the first embodiment, when the ring gear 24 moves from the second engagement position to the first engagement position, the speed reduction mechanism 18 is switched from the low speed rotation mode to the high speed rotation mode. When the ring gear 24 moves from the first engagement position to the second engagement position, the speed reduction mechanism 18 is switched from the high speed rotation mode to the low speed rotation mode. In the first embodiment, the second engagement position, at which the speed reduction mechanism 18 is switched to the low speed rotation mode, is set as an initial position of the ring gear 24.

In the first embodiment, the initial position corresponds to the reference position that is preset so that the components related to the switching of the speed reduction ratio, such as the ring gear 24, have the relative positional relationship. When the components are coupled to the main body case 12, the components are positioned so that each component is located at a predetermined initial position.

A gearshift actuator 25, which moves the ring gear 24 to switch the speed reduction ratio, is located in the barrel 13 of the main body case 12 below the speed reduction mechanism 18. The gearshift actuator 25 includes an accommodation case 26, which is longitudinally elongated in the axial direction of the motor 16. The accommodation case 26 accommodates a plurality of components forming the gearshift actuator 25. The accommodation case 26, which accommodates the components, is fastened by a screw to the main body case 12.

The accommodation case 26 accommodates a gearshift motor 27, which is capable of producing rotation in forward and backward directions, and a power transmission unit 29, which decelerates and transmits the rotary power of an output shaft 28 of the gearshift motor 27. The gearshift motor 27 is arranged at a rear position in the accommodation case 26 so that an axis AX2 of the output shaft 28 of the gearshift motor 27 is parallel to the axis AX1 of the motor 16.

The structure of the power transmission unit 29, which is located at the front side of the gearshift motor 27 in the accommodation case 26, will now be described.

A drive gear 30 is fixed to the output shaft 28 of the gearshift motor 27 so that the drive gear 30 rotates integrally with the output shaft 28. Below the output shaft 28, a connection shaft 31 is rotatably supported by the accommodation case 26, and a first speed reduction gear 32 is integrally rotatable with the connection shaft 31 and engaged with the drive gear 30. A first spur gear 33 is coupled to a front end of the connection shaft 31 that is opposite to the rear end, on which the first speed reduction gear 32 is arranged, so that the first spur gear 33 rotates integrally with the connection shaft 31.

Above the connection shaft 31, a rotation shaft 34, which is parallel to the connection shaft 31, is rotatably supported by the accommodation case 26. A second speed reduction gear 35, which is engaged with the first spur gear 33, is coupled to and rotated integrally with the rotation shaft 34. Additionally, a second spur gear 36 is coupled to the rotation shaft 34 at the front side from the second speed reduction gear 35 so that the second spur gear 36 rotates integrally with the rotation shaft 34. Further, an output gear 37 is coupled to the rotation shaft 34 at the rear side of the second speed reduction gear 35 so that the output gear 37 rotates integrally with the rotation shaft 34.

A transmission shaft 38, the axial direction of which is aligned with that of the connection shaft 31, is supported in front of the connection shaft 31 and rotatably supported by the accommodation case 26. A rear end of the transmission shaft 38 is coupled to a third speed reduction gear 39, which is engaged with the second spur gear 36, so that the third speed reduction gear 39 rotates integrally with the transmission shaft 38. Additionally, a third spur gear 40 is coupled to the transmission shaft 38 in front of the third speed reduction gear 39 so that the third spur gear 40 rotates integrally with the transmission shaft 38.

A detection shaft 41, the axial direction of which is aligned with those of the output shaft 28 and the rotation shaft 34, is located in front of the rotation shaft 34 and rotatably supported by the accommodation case 26. An adjustment gear 42, which is engaged with the third spur gear 40, is coupled to a rear end of the detection shaft 41 so that the adjustment gear 42 rotates integrally with the detection shaft 41. The detection shaft 41, which is driven and rotated by the gearshift motor 27, and the adjustment gear 42, which rotates integrally with the detection shaft 41, form a rotation body 44. A front end of the detection shaft 41 is coupled to a position detector 43, which is supported by the accommodation case 26.

A position of the accommodation case 26 overlapped with the axis AX2 as viewed from beside the accommodation case 26 is set as a device side positioning reference. The adjustment gear 42, which rotates integrally with the detection shaft 41, includes a positioning mark at a predetermined position in the rotating direction.

In the first embodiment, the adjustment gear 42 includes a slot 42a, which is formed by cutting away a tooth from a position corresponding to the device side positioning reference. The slot 42a is set as the positioning mark. The rotation body 44 is configured to be located at the initial position when the slot 42a of the adjustment gear 42 is positioned at the device side positioning reference.

In the power transmission unit 29, the rotation shaft 34 and the output gear 37 are driven and rotated by the gearshift motor 27. The detection shaft 41 and the adjustment gear 42 rotate in cooperation with the rotation shaft 34, which is driven and rotated by the gearshift motor 27. In this case, the rotary power of the gearshift motor 27 is reduced in speed by the first speed reduction gear 32 and the second speed reduction gear 35 and transmitted to the rotation shaft 34. Additionally, through the third speed reduction gear 39 and the adjustment gear 42, the rotary power is further reduced in speed from that in the rotation shaft 34 and transmitted to the detection shaft 41. The position detector 43 detects the position of the ring gear 24 by outputting an electrical output in correspondence with the rotational rotation angle of the detection shaft 41.

Near the longitudinally middle section of the accommodation case 26, the gearshift actuator 25 includes a cam member 45, which is engaged, from an upper side, with the output gear 37 of the power transmission unit 29. The cam member 45 is driven and rotated by the gearshift motor 27. This slides the ring gear 24 between the first and second engagement positions. In the first embodiment, the speed reduction mechanism 18 and the gearshift actuator 25 form an automatic gearshift device of the power tool 11.

The motor 16, the gearshift motor 27, and the position detector 43 are electrically connected to a controller 46, which is accommodated in the main body case 12. The output shaft 17 of the motor 16 includes a rotation detector 47, which is used to detect the rotation speed of the motor 16. Further, a current detector 48, which is used to detect the drive current supplied to the motor 16, is arranged between the motor 16 and the controller 46. The rotation detector 47 and the current detector 48 form a driving state detector 49, which detects the driving state of the motor 16.

The accommodation case 26 includes a case member 26a, which is arranged at the right side of the accommodation case 26 as viewed from the front side. The case member 26a includes an accommodation recess 50, which opens toward the left. The accommodation recess 50 is shaped in conformance with the contours of the gearshift motor 27 and the power transmission unit 29.

Figure 2:
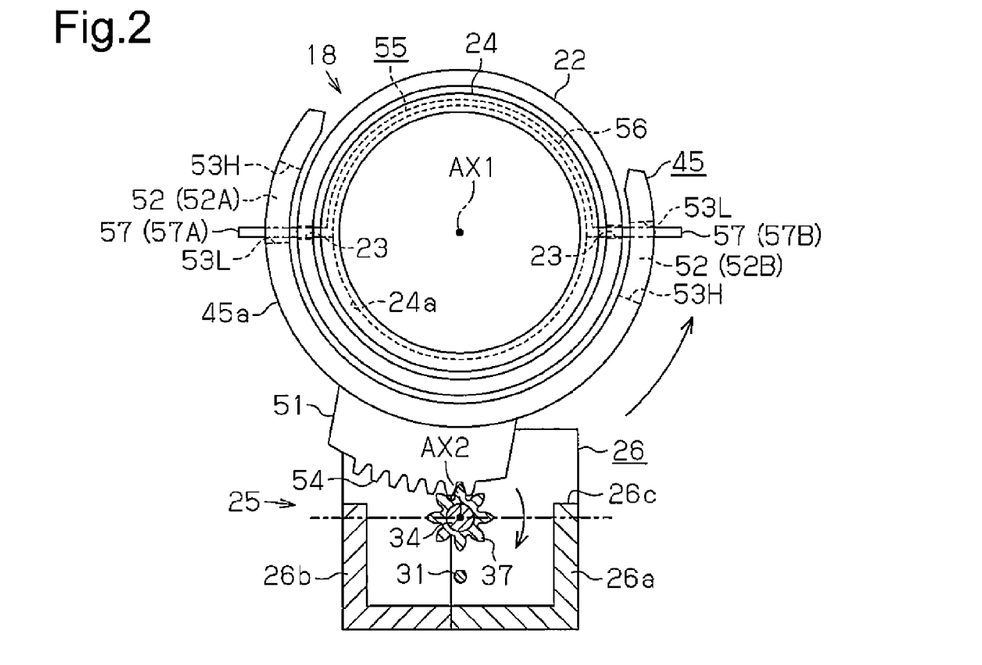
FIG. 2 is a cross-sectional view of an automatic gearshift device in a low speed rotation mode.

As shown in FIG. 2, the accommodation case 26 includes the case member 26a and a case member 26b, which is combined with the case member 26a. The case member 26b includes an accommodation recess (not shown), which is shaped symmetrically to the accommodation recess 50 and which opens toward the right. The case member 26b is fastened by a screw to the case member 26a to cover the opening of the case member 26a. This forms the accommodation case 26.

The lateral length of the case member 26a is set to be longer than the lateral length of the case member 26b. To simplify the drawing, FIG. 2 omits the illustration of components, such as the carrier 18a, the planet gear 18b, and the fixed tooth portion 18c, which form the speed reduction mechanism 18.

An opening 26c, which opens upward, is arranged in the case members 26a and 26b near the longitudinally middle section of in the longitudinal direction (direction orthogonal to the plane of FIG. 2). An upper portion of the output gear 37 is exposed through the opening 26c in the accommodation case 26. The teeth of the output gear 37, which are exposed in the accommodation case 26, are engaged with the cam member 45.

The cam member 45 includes a main body 45a, which is arcuate as viewed from the front, an engagement portion 51, which projects from the main body 45a outward in the radial direction. Two cam holes 52 (52A and 52B) are formed in the proximity of the two circumferential ends of the main body 45a. The cam hole 52A, which is located at the left side as viewed from the front side, includes a first holding portion 53H, which is located in a straight portion extending downward from the upper end, and a second holding portion 53L, which is located in a straight portion extending upward from the lower end of the cam hole 52A.

The cam hole 52B, which is located on the right side as viewed from the front side, includes a second holding portion 53L, which is arranged in a straight portion extending downward from the upper end, and a first holding portion 53H, which is arranged in a straight portion extending upward from the lower end side of the cam hole 52B. An arcuate distal end of the engagement portion 51 includes a teeth-shaped engagement portion 54, which can be engaged with the output gear 37.

In the cam member 45, a cylindrical side wall of the gear case 22 is arranged at the inner side of the main body 45a. The gear case 22 accommodates the ring gear 24. An outer circumferential surface of the ring gear 24 includes a groove 24a, which extends in the circumferential direction. A support member 55 is fitted to the groove 24a so that the support member 55 can slide along the ring gear 24.

The support member 55 includes a support main body 56, which is arcuate as viewed from the front side along the outer circumferential surface of the ring gear 24, and two insertion portions 57 (57A and 57B), which extend straight from the two ends of the support main body 56 toward the outer side in the radial direction. The two insertion portions 57 of the support member 55 extend from the inner side though the two through holes 23 of the gear case 22 and further extend through the two cam holes 52 of the cam member 45.

When the output gear 37 is engaged with a tooth located at one end (right end in FIG. 2) of the teeth-shaped engagement portion 54, the insertion portion 57A of the support member 55 is located on the second holding portion 53L of the cam hole 52A, and the insertion portion 57B of the support member 55 is located on the second holding portion 53L of the cam hole 52B. In this case, the ring gear 24 is located in the second engagement position that is the initial position (relatively front side position indicated by broken lines in FIG. 1), and the speed reduction ratio is set to the low speed rotation mode. In the description hereinafter, the position of the cam member 45 in this situation is referred to as the low speed position. The low speed position of the cam member 45 is set as the initial position.

Figure 3:
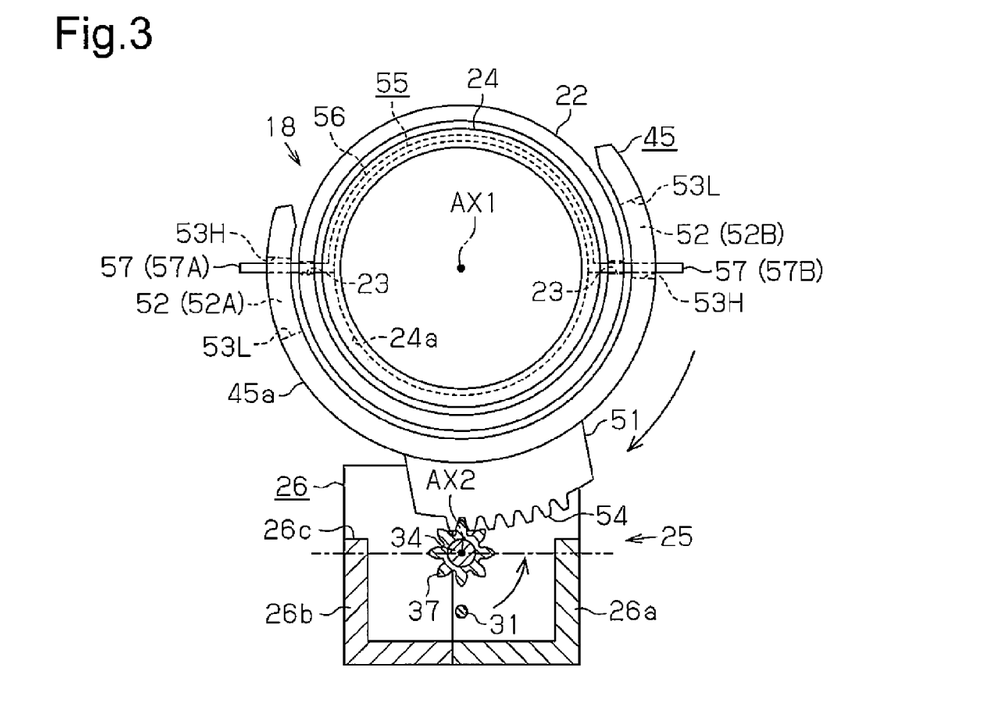
FIG. 3 is a cross-sectional view of the automatic gearshift device in a high speed rotation mode.

When the output gear 37 rotates in the clockwise direction from the position shown in FIG. 2, the cam member 45 rotates in the counterclockwise direction. As shown in FIG. 3, when the rotation angle of the output gear 37 reaches rotation angle α1, the tooth located at the other end of the teeth-shaped engagement portion 54 (left end in FIG. 3) is engaged with the output gear 37. In this case, the insertion portion 57A of the support member 55 is located on the first holding portion 53H of the cam hole 52A, and the insertion portion 57B of the support member 55 is located on the first holding portion 53H of the cam hole 52B. When the cam member 45 rotates, the ring gear 24 moves from the second engagement position to the first engagement position (relatively rear position indicated by broken lines in FIG. 1). This switches the speed reduction ratio from the low speed rotation mode to the high speed rotation mode. In the description hereinafter, the position of the cam member 45 described above is referred to as a high speed position.

In the same manner, when the output gear 37 rotates in the counterclockwise direction from the position shown in FIG. 3, the cam member 45 rotates in the clockwise direction. When the rotation angle of the output gear 37 reaches rotation angle $-\alpha1$, the cam member 45 returns from the high speed position to the low speed position, which is shown in FIG. 2. In this case, the ring gear 24 moves from the first engagement position to the second engagement position. This switches the speed reduction ratio from the high speed rotation mode to the low speed rotation mode.

Figure 4:
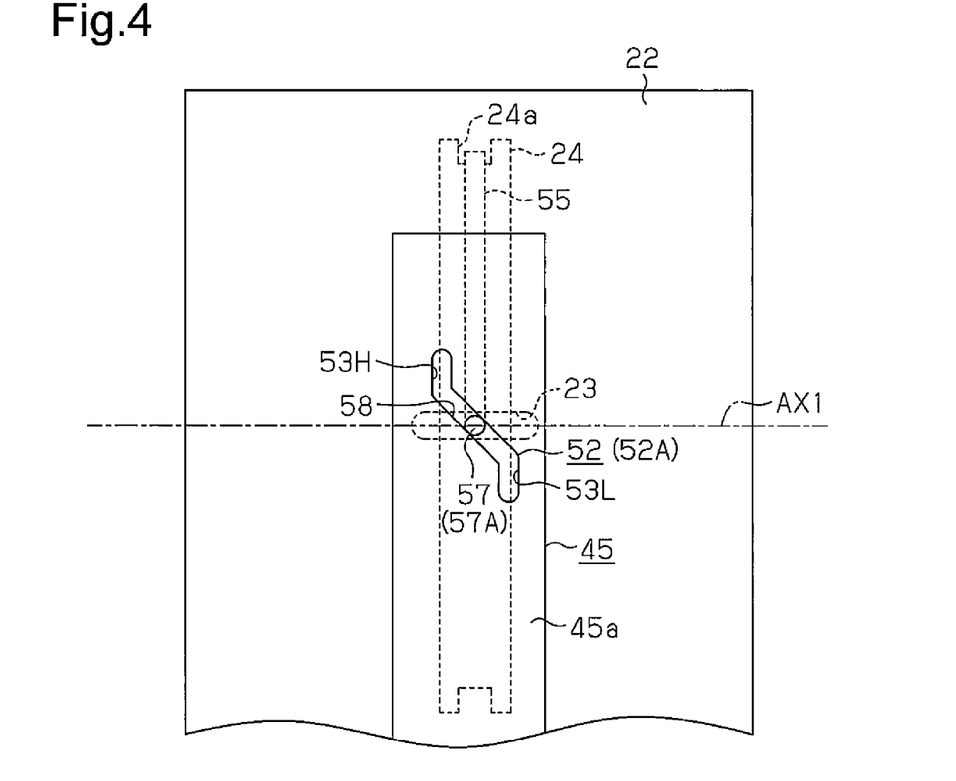
FIG. 4 is a side view of a portion of a cam member including a cam hole.

As shown in FIG. 4, the cam hole 52 has a bent shape that corresponds to the movement of the ring gear 24. More specifically, the cam hole 52 includes a cam portion 58, which extends in a direction tilted by 45° with respect to the axis AX1 as viewed from beside and connects a lower end of the first holding portion 53H and an upper end of the second holding portion 53L.

The through hole 23 of the gear case 22 is elongated parallel to the axis AX1. This allows for movement of the support member 55, of which the insertion portion 57 extends through the cam hole 52, in the axial direction and restricts the movement in the vertical direction. Therefore, when the cam member 45 rotates from the low speed position toward the high speed position, the support member 55 moves rearward (leftward in FIG. 4) along the through hole 23 together with the ring gear 24 as the insertion portion 57, which extends through the cam hole 52, slides in contact with the cam portion 58. That is, the cam portion 58, which is formed in the main body 45a of the cam member 45, guides the ring gear 24 in the axial direction in cooperation with the rotating of the cam member 45.

When the cam member 45 rotates from the high speed position toward the low speed position, the support member 55 moves frontward (rightward in FIG. 4) along the through hole 23 together with the ring gear 24 as the insertion portion 57, which extends through the cam hole 52, slides in contact with the cam portion 58. In this manner, the ring gear 24 slides between the first and second engagement positions in cooperation with the rotating of the cam member 45.

The position detector 43 will now be described.

Figure 5:
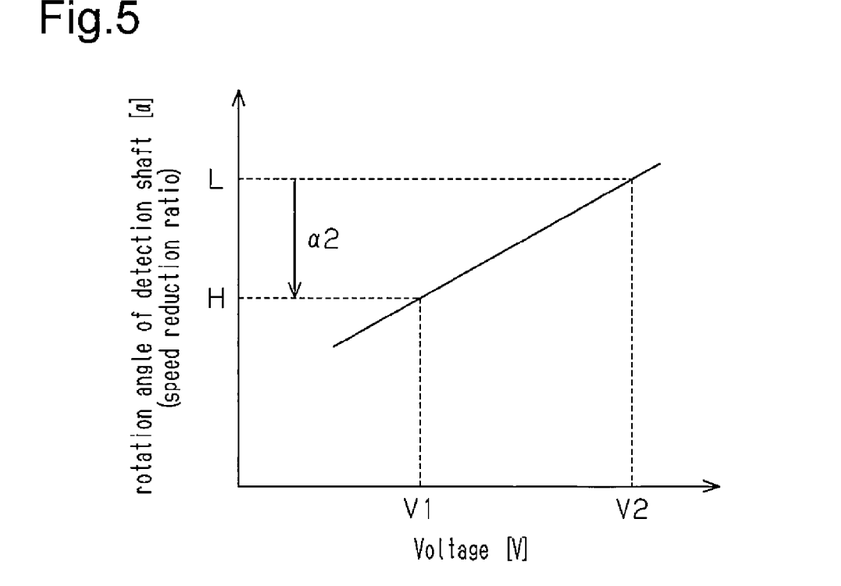
FIG. 5 is a graph showing the relationship of a rotation angle of a detection shaft and the voltage output from a position detector.

The rotation angle $\alpha$ of the detection shaft 41 and the voltage V generated by the position detector 43 are set in advance to have a constant relationship as shown in FIG. 5.

The detection shaft 41 rotates in cooperation with the rotation shaft 34. The rotation shaft 34 rotates integrally with the output gear 37, which rotates the cam member 45. When the rotation shaft 34 is rotated by the rotation angle $\alpha1$ so that the speed reduction ratio is switched from the low speed rotation mode to the high speed rotation mode, the detection shaft 41 is rotated by a rotation angle $\alpha2$. When the rotation shaft 34 is rotated by the rotation angle $-\alpha1$ so that the speed reduction ratio is switched from the high speed rotation mode to the low speed rotation mode, the detection shaft 41 is rotated by a rotation angle $-\alpha2$. The rotation angles $\alpha1$ and $\alpha2$ have a constant relationship based on the speed reduction ratio determined by the third speed reduction gear 39 and the adjustment gear 42.

When the ring gear 24 is located at the second engagement position that is the initial position, the cam member 45 is located in the low speed position that is the initial position, and the slot 42a of the rotation body 44 is located at the initial position, which is aligned with the device side positioning reference. In this manner, when the ring gear 24, the cam member 45, and the rotation body 44 are each located at the corresponding initial position to establish the preset relative positional relationship, the position detector 43 outputs a voltage V2, which corresponds to the second engagement position where the ring gear 24 is located. That is, when the speed reduction ratio is in the low speed rotation mode L, the position detector 43 generates the voltage V2, which serves as an initial value.

When the detection shaft 41 starts rotating from the initial position, the voltage V generated by the position detector 43 gradually decreases in accordance with the rotation angle of the detection shaft 41. When the rotation angle of the detection shaft 41 from the initial position reaches the rotation angle $\alpha2$, which is needed to move the ring gear 24 from the second engagement position to the first engagement position, the position detector 43 generates voltage V1, which corresponds to the first engagement position. That is, when the speed reduction ratio is in the high speed rotation mode H, the position detector 43 generates the voltage V1.

In the same manner, when the position detector 43 is generating the voltage V1, if the detection shaft 41 starts rotating in the reverse direction, the voltage V generated by the position detector 43 gradually increases in accordance with the rotation angle of the detection shaft 41. When the detection shaft 41 rotates in the reverse direction to the rotation angle $-\alpha2$, which is needed for moving the ring gear 24 from the first engagement position to the second engagement position, the position detector 43 generates the voltage V2.

In this manner, when the rotation angle of the rotation body 44 reaches the rotation angle needed to move the ring gear 24 to the engagement position, the position detector 43 generates a value corresponding to the engagement position after the movement. This indirectly detects the position of the ring gear 24. Based on the voltage V generated by the position detector 43, the controller 46 determines whether or not the ring gear 24 has reached the engagement position, the engagement position where the ring gear 24 is located, and the mode of the speed reduction ratio.

The switching of the speed reduction ratio performed by the automatic gearshift device will now be described with reference to FIG. 1.

The controller 46 controls and drives the gearshift motor 27 based on the present speed reduction ratio determined from the detection result of the position detector 43 and the detection result of the driving state detector 49. For example, during the low speed rotation mode, when the driving state detector 49 detects that a load applied to the motor 16 reaches a predetermined level, the controller 46 drives the gearshift motor 27 to rotate in the forward direction so that the ring gear 24 slides rearward from the second engagement position. When the ring gear 24 moves to the first engagement position, the speed reduction ratio is switched to the high speed rotation mode.

More specifically, the driving state detector 49 detects that the load applied to the motor 16 has reached the predetermined level when the current flowing in the motor 16 becomes greater than or equal to a predetermined value, the rotation speed of the motor 16 becomes less than or equal to a predetermined value, or the like. In this manner, in the power tool 11, the speed reduction ratio is automatically switched in accordance with the driving state of the motor 16.

When determined that the ring gear 24 is located between the first and second engagement positions from the detection result of the position detector 43, the controller 46 may temporarily stop driving the gearshift motor 27 and temporarily increase the rotary power of the motor 16.

That is, when the ring gear is disengaged from one gear member, inertia continues to rotate the ring gear. When the ring gear is moved and engaged with another gear member, a reaction force is applied to the ring gear from the other gear member. Therefore, when temporarily stopping the driving of the gearshift motor 27 to temporarily stop the movement of the ring gear 24, an increase in the rotary power of the motor 16 increases the reaction force applied to the ring gear 24 when contacting the other gear member. The reaction force lowers the rotation speed of the ring gear 24 resulting from inertia. This decreases the impact produced when the ring gear 24 is engaged with the other gear member.

The alignment of components when coupling the automatic gearshift device to the main body case 12 will now be described sequentially referring to FIGS. 1, 6 and 2.

When coupling the automatic gearshift device to the main body case 12, the position detector 43, the rotation body 44, the cam member 45, and the ring gear 24 are each located in the corresponding initial position shown in FIG. 1.

When coupling the power transmission unit 29 to the case member 26a, the slot 42a is first aligned with the device side positioning reference, and the adjustment gear 42 is located in the axis AX2. In this case, the slot 42a is located at the outer side, or open side, of the case member 26a. That is, the device side positioning reference, which is set in the accommodation case 26, is set at a position overlapping the axis AX2 as viewed from the open side of the case member 26a.

When aligned with the detection shaft 41 of the rotation body 44, the position detector 43 is coupled to the accommodation case 26. Consequently, when the slot 42a in the adjustment gear 42 of the rotation body 44 is aligned with the device side positioning reference, the position detector 43 generates the voltage V2, which corresponds to the second engagement position.

Figure 6:
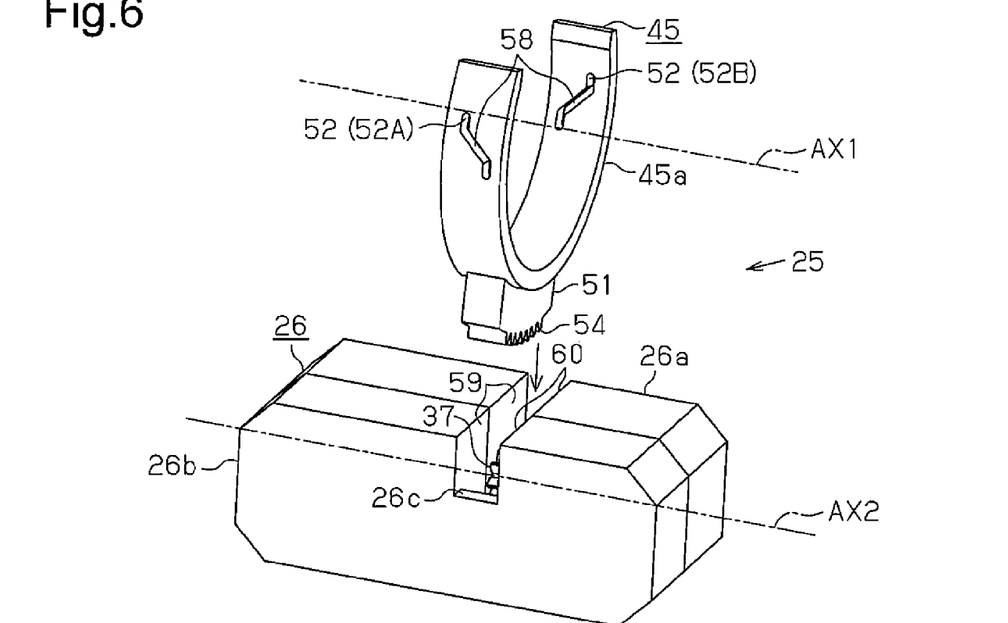
FIG. 6 is a perspective view taken when assembling a gearshift actuator.

After incorporating the gearshift motor 27 and the power transmission unit 29 into the case member 26a, the case member 26b is coupled to the case member 26a as shown in FIG. 6. The case members 26a and 26b include two partition walls 59 and 60, which intersect (extend orthogonal to in the first embodiment) the axis AX2 and are located at opposite sides of the opening 26c. Therefore, when the two case members 26a and 26b are coupled, the upper portion of the output gear 37 is exposed through the opening 26c from the accommodation case 26, while the accommodation case 26 accommodates and conceals the other components.

The cam member 45 is attached to the output gear 37, which is exposed through the opening 26c of the accommodation case 26, from above as shown by the arrow in FIG. 6. In this case, an end tooth of the teeth-shaped engagement portion 54 (right end in the present embodiment) is engaged with the output gear 37 so that the cam member 45 is located at the low speed position that is the initial position.

Further, as shown in FIG. 2, the cam member 45, which is located at the low speed position that is the initial position, is combined with the speed reduction mechanism 18, which includes the ring gear 24 located at the second engagement position that is the initial position. This arranges the insertion portion 57 of the support member 55 in the second holding portion 53L of the cam hole 52 and positions the cam member 45 and the ring gear 24.

Consequently, when the slot 42a of the rotation body 44 is aligned with the device side positioning reference, the ring gear 24 is located at the second engagement position, and each component is positioned so that the position detector 43 generates the voltage V2 corresponding to the second engagement position. Thus, the speed reduction mechanism 18 and the gearshift actuator 25, which are aligned as described above, are coupled to the main body case 12. This establishes the relative positional relationship of the position detector 43, the rotation body 44, the cam member 45, and the ring gear 24, which are used to switch the speed reduction ratio.

The operation of the automatic gearshift device will now be described.

In the automatic gearshift device, when the slot 42a of the adjustment gear 42 is aligned with the device side positioning reference that is set in the accommodation case 26, the ring gear 24 is located at the second engagement position. In this case, the position detector 43 generates the voltage V2 corresponding to the second engagement position.

If the slot 42a of the adjustment gear 42 is displaced from the device side positioning reference when coupled to the accommodation case 26, the ring gear 24 may not be located at the second engagement position even though the position detector 43 is generating the voltage V2. Thus, when coupled to the accommodation case 26 and the main body case 12, there is a need to properly position the ring gear 24, the cam member 45, and the detection shaft 41, which are the components of the automatic gearshift device, at the corresponding initial position.

However, as compared with the ring gear 24 and the cam member 45, it is difficult to visually check whether or not the detection shaft 41, to which the position detector 43 is coupled, is located at the initial position. In this regard, in the first embodiment, the adjustment gear 42, which rotates integrally with the detection shaft 41, includes the slot 42a. Thus, the determination of whether or not the detection shaft 41 is located at the initial position may be easily determined by using the slot 42a of the adjustment gear 42 as a mark.

That is, when assembling the automatic gearshift device, by looking at or touching the slot 42a, the detection shaft 41 and the position detector 43 may be easily positioned. The device side positioning reference is set at a position that overlaps the axis AX2 as viewed from beside, which is the opening side of the case member 26a. This allows for alignments to be performed using the axial direction of the output shaft 28 or the rotation shaft 34 as a mark, and there is no need to use a visible mark applied to the case member 26a as the device side positioning reference.

The automatic gearshift device of the first embodiment has the advantages described below.

(1) The visible slot 42a of the adjustment gear 42 is set as the positioning mark so that the rotation body 44 can be aligned with the device side positioning reference, which is set in advance. This allows for easy alignment of the position detector 43 and the rotation body 44, which are the components of the automatic gearshift device, relative to the device.

(2) In the rotation body 44, the slot 42a, which is formed by cutting away a tooth of the adjustment gear 42 that is in a position corresponding to the device side positioning reference, is set as the positioning mark. Thus, in addition to visual checking, the slot 42a may be touched when performing alignment with the device side positioning reference. Compared to when drawing a positioning mark with paint or the like, the positioning mark will not be erased when sliding or the like occurs. This provides a further ensured mark.

(3) When the slot 42a, which is the positioning mark of the rotation body 44, is aligned with the device side positioning reference set in the accommodation case 26, the ring gear 24 is located at the second engagement position. The second engagement position is set as the initial position of the ring gear 24 that corresponds to the initial position of the rotation body 44. This easily allows for the alignment of the rotation body 44 and the ring gear 24 in the relative positional relationship.

Second Embodiment

An automatic gearshift device according to a second embodiment of the present invention will now be described with reference to FIGS. 7 and 8.

Figure 7:
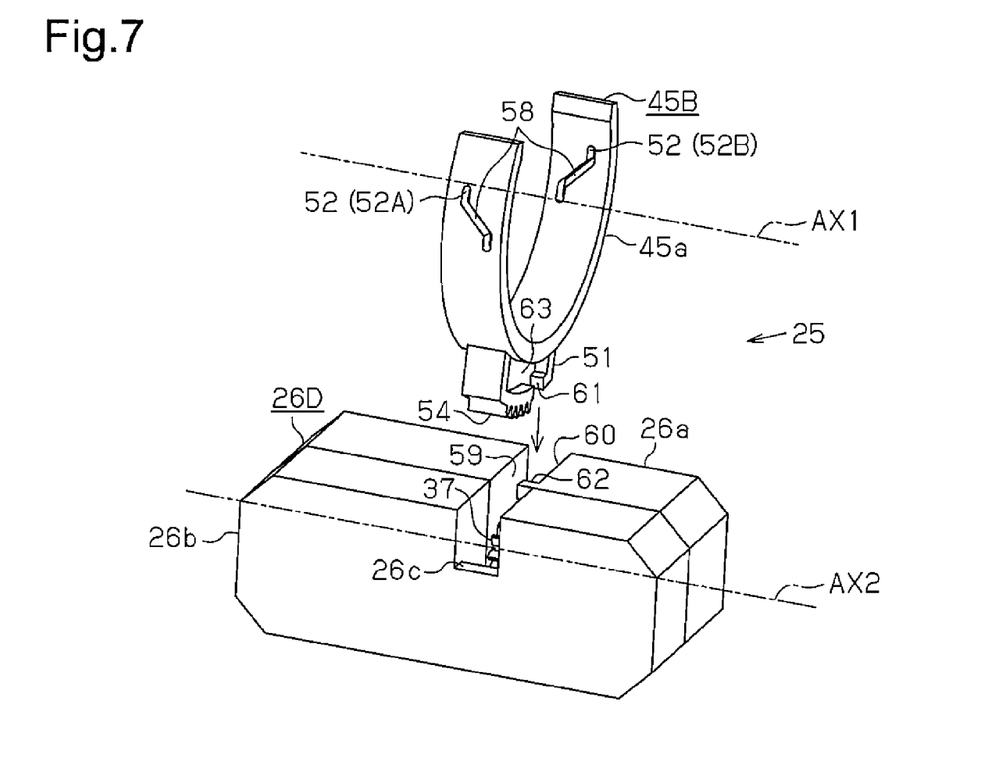
FIG. 7 is a perspective view taken when assembling a gearshift actuator of a second embodiment.

As shown in FIG. 7, the second embodiment differs from the first embodiment in that the engagement portion 51 of a cam member 45B includes an alignment groove 61 and the case member 26a forming an accommodation case 26D includes an alignment projection 62.

More specifically, in the cam member 45B of the second embodiment, a front surface of the engagement portion 51 includes the alignment groove 61 that extends in the projecting direction of the engagement portion 51 in a portion of the outer circumferential surface at the distal end (right end in the second embodiment). Further, the alignment groove 61 has a fixed depth from the outer circumferential surface. Additionally, the engagement portion 51 includes a recess 63, which extends along the teeth-shaped engagement portion 54 between the main body 45a and the teeth-shaped engagement portion 54 and has a fixed depth in the thickness direction of the engagement portion 51. An end portion of the alignment groove 61 that is closer to the main body 45a is in communication with the inside of the recess 63.

The alignment projection 62 projects rearward and toward the partition wall 59 from near the upper end of the partition wall 60 at the end at the open side of the case member 26a. The length of the alignment projection 62 in the lateral direction is set to be shorter than the length of the alignment groove 61 in the lateral direction. Further, the length of the alignment projection 62 in the vertical direction is set to be shorter than the length of the recess 63 in the projecting direction of the engagement portion 51. This allows the alignment projection 62 of the accommodation case 26D to be inserted through the alignment groove 61 of the cam member 45B.

The operation of the automatic gearshift device of the second embodiment, which is configured in the above manner, will now be described.

When the cam member 45B is coupled to the accommodation case 26D, which accommodates the components of the gearshift actuator 25, from above as shown in FIG. 7 by the arrow, the alignment projection 62 of the accommodation case 26D may be inserted from a lower side of the alignment groove 61 of the cam member 45B.

Figure 8:
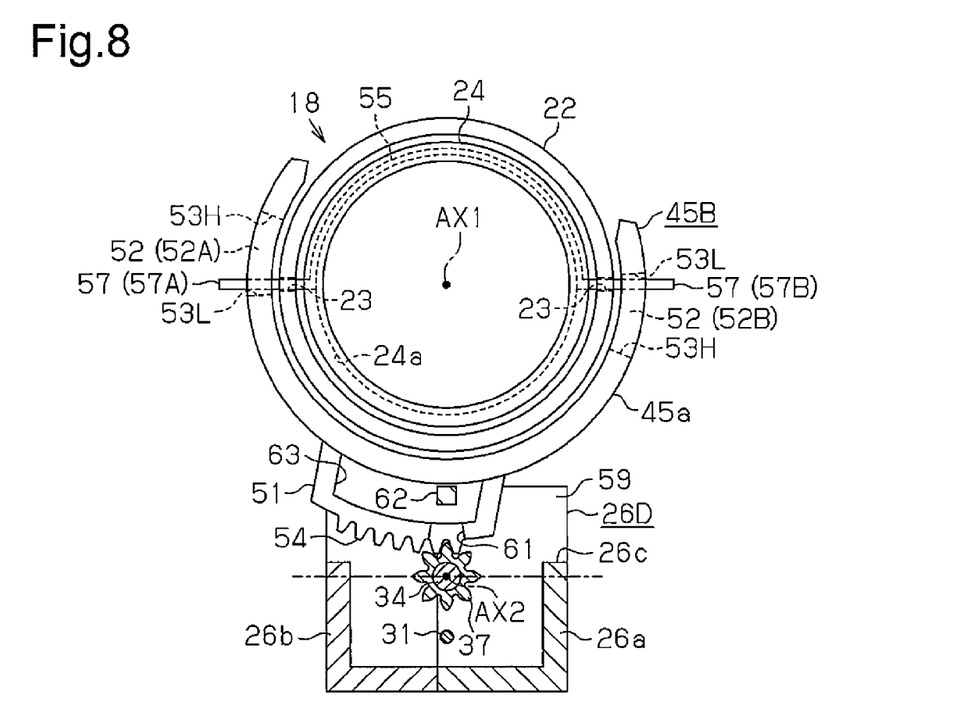
FIG. 8 is a cross-sectional view of an automatic gearshift device of a second embodiment.

As shown in FIG. 8, when a tooth of the teeth-shaped engagement portion 54 located at a position corresponding to the alignment groove 61 is engaged with the output gear 37, the cam member 45B is located in the low speed position that is the initial position. That is, the cam member 45B and the accommodation case 26D are aligned with each other using the alignment groove 61 and the alignment projection 62. This positions the cam member 45B in the low speed position that is the initial position. Additionally, the cam member 45B, which is aligned in the above manner, positions the ring gear 24 at the second engagement position. This indirectly aligns the rotation body 44 and the ring gear 24 with each other through the cam member 45B.

When the teeth-shaped engagement portion 54 of the cam member 45B is engaged with the output gear 37, the alignment projection 62 of the accommodation case 26D extends through the alignment groove 61 of the engagement portion 51 of the cam member 45B and is located in the recess 63. Thus, when the cam member 45B rotates in accordance with the rotating of the output gear 37, the alignment projection 62 is located in the recess 63. This prevents the alignment projection 62 from interfering with the alignment groove 61 of the engagement portion 51.

The second embodiment has the following advantages in addition to advantages (1) to (3).

(4) When the output gear 37 is engaged with the cam member 45B, the alignment projection 62 of the accommodation case 26D extends through the alignment groove 61 formed in the engagement portion 51. This allows the cam member 45B to be coupled to the accommodation case 26D at a predetermined angle. The coupling position is set as the initial position of the cam member 45B, which corresponds to the initial position of the rotation body 44. This easily allows for the alignment of the cam member 45B and the rotation body 44, which have the relative positional relationship. Further, the position where the ring gear 24 is located in the second engagement position is set as the initial position of the cam member 45B. This easily allows for the positioning of the cam member 45B and the ring gear 24 in the relative positional relationship.

Third Embodiment

An automatic gearshift device according to a third embodiment of the present invention will now be described with reference to FIG. 9.

Figure 9:
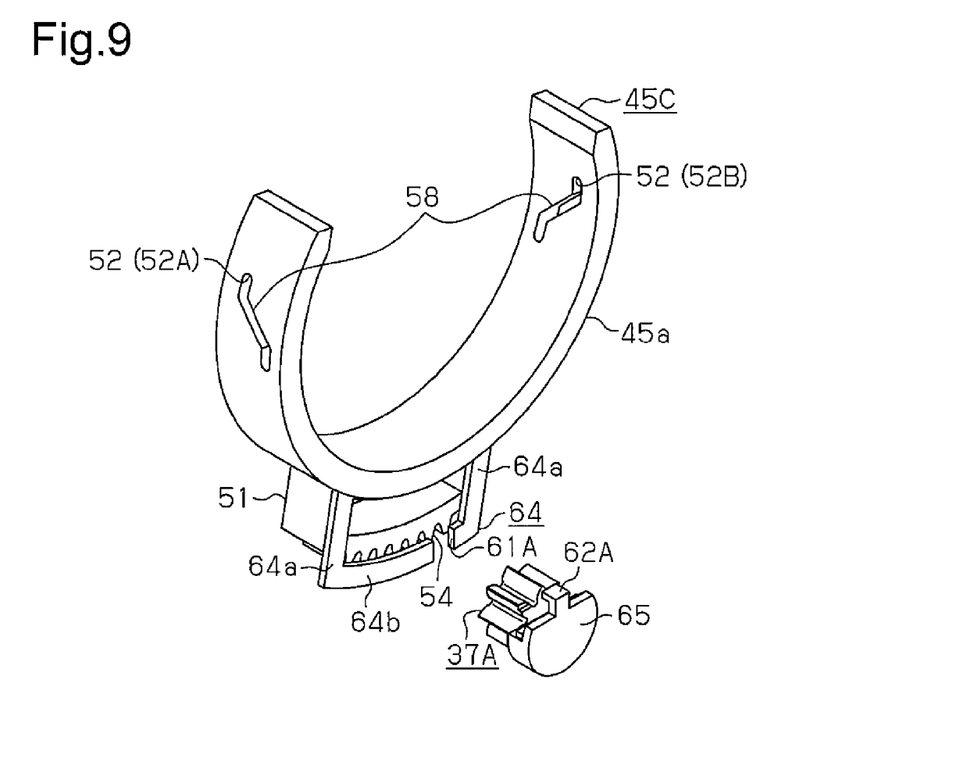
FIG. 9 is a perspective view showing a gearshift cam plate and an output gear of a third embodiment.

As shown in FIG. 9, the third embodiment differs from the first embodiment in that the engagement portion 51 of a cam member 45C includes an alignment groove 61A and in that an output gear 37A includes an alignment projection 62A.

In detail, in the cam member 45C of the third embodiment, a front surface of the engagement portion 51 includes an alignment plate 64. The alignment plate 64 is formed to extend from the main body 45a beyond the engagement portion 51. The alignment plate 64 includes an alignment groove (61A), which is formed by cutting away a portion of a distal end of the alignment plate 64. More specifically, the alignment plate 64 includes extension portions 64a, which extend from the outer circumferential surface of the main body 45a along the two radial ends of the engagement portion 51, and a distal portion 64b, which extends from distal ends of the two extension portions 64a along the teeth-shaped engagement portion 54 and is arcuate as viewed from the front.

A distal end of the distal portion 64b of the alignment plate 64 projects beyond the distal end of the teeth-shaped engagement portion 54. The engagement portion 51 includes an alignment groove 61A, which is formed by cutting away part of the distal portion 64b (right side in the third embodiment).

A disk-like alignment portion 65 is arranged on a front surface of the output gear 37A that is orthogonal to the rotation shaft 34. An upper portion of the alignment portion 65 is flat. An alignment projection 62A projects from the flat surface, and a distal end of the alignment projection 62A is bent toward the main body 45a. The length of the alignment projection 62A in the lateral direction is set to be shorter than the length of the alignment groove 61A in the lateral direction. This allows the alignment projection 62A of the output gear 37A to be inserted through the alignment groove 61A of the cam member 45C.

The operation of the automatic gearshift device of the third embodiment will now be described.

When the cam member 45C is coupled to the accommodation case 26, which accommodates the components of the gearshift actuator 25, the alignment projection 62A of the output gear 37A is inserted through the alignment groove 61A of the cam member 45C from a lower side.

When a tooth of the teeth-shaped engagement portion 54 that is located corresponding to the alignment groove 61A is engaged with the output gear 37A, the cam member 45C is located in the low speed position that is the initial position.

That is, cam member 45C and the accommodation case 26 are aligned with each other by the alignment groove 61A and the alignment projection 62A. This positions the cam member 45C in the low speed position serving as the initial position. Additionally, the cam member 45C, which is aligned in this manner, positions the ring gear 24 in the second engagement position. This indirectly aligns the rotation body 44 and the ring gear 24 with each other through the cam member 45C.

When the teeth-shaped engagement portion 54 of the cam member 45C is engaged with the output gear 37A, the alignment projection 62A of the output gear 37A is located above the distal portion 64b. When the rotation of the output gear 37A rotates the cam member 45C, the alignment projection 62A is located between the main body 45a and the distal portion 64b. This avoids interference of the alignment projection 62A with the alignment groove 61A of the engagement portion 51.

The third embodiment has the following advantages in addition to advantages (1) to (3).

(5) When the output gear 37A is engaged with the cam member 45C, the alignment projection 62A of the output gear 37A is inserted through the alignment groove 61A formed in the engagement portion 51. This allows the cam member 45C to be coupled to the accommodation case 26 at a predetermined angle. The coupling position is set as the initial position of the cam member 45C, which corresponds to the initial position of the rotation body 44. This easily allows for the alignment of the cam member 45C and the rotation body 44 in the relative positional relationship. Further, the position where the ring gear 24 is located in the second engagement position is set as the initial position of the cam member 45C. This easily allows for the alignment of the cam member 45C and the ring gear 24 in the relative positional relationship.

The above embodiments may be modified as follows.

The detection shaft 41 may include the positioning mark.

The positioning mark may be applied to the rotation body 44 with paint or by laser printing. A positioning recess or a through hole, which are formed in the rotation body 44, may be used as the positioning mark.

The first engagement position may be set as the initial position of the ring gear 24. Alternatively, a position differing from the first and second engagement positions may be set as the initial position. In any case, it is only necessary that each component be aligned so that the position detector 43 generates a value corresponding to the initial position of the ring gear 24 when the ring gear 24 is in the initial position.

When the gearshift actuator 25 does not include the accommodation case 26, and the components of the gearshift actuator 25 are directly coupled to the main body case 12, the main body case 12 may include the device side positioning reference.

The ring gear 24 may be configured to move among three or more engagement positions, and the speed reduction ratio may be changed among three or more stages.

The axes of the output shaft 28, the rotation shaft 34, and the detection shaft 41 does not have to be located on the same axis AX2.

The position detector 43 may generate the voltage V1 when the speed reduction ratio is in the low speed rotation mode and the voltage V2 when the speed reduction ratio is in the high speed rotation mode.

What is claimed is:

1. An automatic gearshift device for a power tool comprising:
    a speed reduction mechanism including a gear member, wherein the speed reduction mechanism decelerates and transmits a rotary power of a driving source;
    a switching member that slides and moves to an engagement position where the switching member engages with the gear member of the speed reduction mechanism to switch a speed reduction ratio of the speed reduction mechanism;
    a gearshift motor;
    a cam member driven and rotated by the gearshift motor to move the switching member to the engagement position;
    a rotation body rotated in cooperation with the cam member when driven by the gearshift motor, wherein the rotation body includes a positioning mark set at a predetermined position in a rotating direction of the rotation body, and the rotation body is positioned in an initial position in a predetermined relative positional relationship with the switching member;
    a position detector that detects movement of the switching member to the engagement position and generates a value indicating that the switching member has moved to the engagement position when the rotation body is rotated from the initial position by a predetermined rotation angle; and
    a controller that controls the driving of the gearshift motor based on the value generated by the position detector, wherein
    the rotation body is located at the initial position when the positioning mark is aligned with a predetermined device side positioning reference.

2. The automatic gearshift device for the power tool according to claim 1, wherein
    the rotation body includes a detection shaft, which is driven and rotated by the gearshift motor, and an adjustment gear, which is rotated integrally with the detection shaft,
    the adjustment gear includes a slot, which is formed by cutting away a tooth located at a position corresponding to the device side positioning reference and which is used as the positioning mark, and
    the position detector generates a value corresponding to a rotation angle of the detection shaft.

3. The automatic gearshift device for the power tool according to claim 1, comprising:
    an accommodation case that accommodates the gearshift motor and the position detector and supports the rotation body so that the rotation body is rotatable, wherein the device side positioning reference is set at a predetermined position in the accommodation case; and
    when the positioning mark of the rotation body is aligned with the device side positioning reference of the accommodation case, the switching member is located at the engagement position and the position detector generates a value indicating that the switching member is located at the engagement position.

4. The automatic gearshift device for the power tool according to claim 1, further comprising:
    a rotation shaft driven and rotated by the gearshift motor;
    an output gear that rotates integrally with the rotation shaft, and
    an accommodation case that supports the rotation shaft and the rotation body so that the rotation shaft and the rotation body are rotatable, wherein
    the cam member includes
        a main body that includes a cam portion, which guides movement of the switching member,
        an engagement portion that projects from the main body and includes an arcuate outer circumferential surface, wherein the engagement portion includes a teeth-shaped engagement portion, which is arranged on a distal end of the arcuate outer circumferential surface and which is capable of engaging with the output gear, and an alignment groove formed in part of a distal end of the engagement portion, wherein the alignment groove includes a fixed depth from the outer circumferential surface, and the accommodation case includes an alignment projection, which can be inserted through the alignment groove when the rotation shaft and the rotation body are coupled to the accommodation case.

5. The automatic gearshift device for the power tool according to claim 1, further comprising:

a rotation shaft driven and rotated by the gearshift motor;
an output gear that rotates integrally with the rotation shaft; and
an accommodation case that supports the rotation shaft and the rotation body so that the rotation shaft and the rotation body are rotatable, wherein the cam member includes
a main body that includes a cam portion, which guides movement of the switching member,
an engagement portion that projects from the main body and includes an arcuate outer circumferential surface, wherein the engagement portion includes a teeth-shaped engagement portion, which is arranged on a distal end of the arcuate outer circumferential surface and which is capable of engaging with the output gear, and
an alignment plate that projects from the main body beyond the engagement portion, wherein the alignment plate includes an alignment groove formed by cutting away a portion of a distal end of the alignment plate, and the output gear includes an alignment projection, which can be inserted through the alignment groove when the rotation shaft and the rotation body are coupled to the accommodation case.

6. The automatic gearshift device for the power tool according to claim 4, wherein the alignment groove is formed toward one end of the distal end of the engagement portion, and when a tooth of the teeth-shaped engagement portion that is located at a position corresponding to the alignment groove is engaged with the output gear, the cam member arranges the switching member at the engagement position.

\* \* \* \* \*